(12) United States Patent  
Lowry et al.

(10) Patent No.: US 10,414,879 B2  
(45) Date of Patent: Sep. 17, 2019

(54) PROCESS TO PRODUCE FLUOROPOLYMER-BASED LATEX WITH MECHANICAL STABILITY

(71) Applicant: SABIC GLOBAL TECHNOLOGIES B.V., Bergen op Zoom (NL)

(72) Inventors: Vern Lowry, Geleen (NL); Yin-Shen Chang, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 74 days.

(21) Appl. No.: 15/564,869

(22) PCT Filed: Apr. 4, 2016

(86) PCT No.: PCT/EP2016/057299  
§ 371 (c)(1),  
(2) Date: Oct. 6, 2017

(87) PCT Pub. No.: WO2016/162291  
PCT Pub. Date: Oct. 13, 2016

(65) Prior Publication Data  
US 2018/0105650 A1    Apr. 19, 2018

Related U.S. Application Data

(60) Provisional application No. 62/144,091, filed on Apr. 7, 2015.

(51) Int. Cl.  
C08J 3/03 (2006.01)  
C08J 3/16 (2006.01)  
C08F 6/14 (2006.01)  
C08L 27/18 (2006.01)  
C08F 2/26 (2006.01)  
C08F 259/08 (2006.01)  
C08F 2/24 (2006.01)  
C08J 3/05 (2006.01)  
C08J 3/12 (2006.01)

(52) U.S. Cl.  
CPC .............. *C08J 3/16* (2013.01); *C08F 2/24* (2013.01); *C08F 2/26* (2013.01); *C08F 259/08* (2013.01); *C08J 3/05* (2013.01); *C08J 3/126* (2013.01); *C08L 27/18* (2013.01); *C08J 2327/18* (2013.01); *C08J 2425/12* (2013.01); *C08L 2201/52* (2013.01)

(58) Field of Classification Search  
None  
See application file for complete search history.

(56) References Cited

U.S. PATENT DOCUMENTS

| | | | |
|---|---|---|---|
| 5,804,654 A | 9/1998 | Lo et al. | |
| 6,040,370 A | 3/2000 | Wozny et al. | |
| 6,921,785 B2 * | 7/2005 | Campbell | C08K 5/523 524/127 |
| 8,686,066 B2 * | 4/2014 | Kwampian | C08F 259/08 523/201 |
| 2012/0302702 A1 | 11/2012 | Kwampian et al. | |
| 2014/0093712 A1 * | 4/2014 | Tong | C08L 69/00 428/220 |

FOREIGN PATENT DOCUMENTS

EP    0739914 A1    10/1996

OTHER PUBLICATIONS

International Search Report for International Application No. PCT/EP2016/057299; dated Jun. 22, 2016; 5 pages.  
Written Opinion of the International Search Report for International Application No. PCT/EP2016/057299; dated Jun. 22, 2016; 6 pages.

* cited by examiner

*Primary Examiner* — Tae H Yoon  
(74) *Attorney, Agent, or Firm* — Cantor Colburn LLP

(57) ABSTRACT

The present disclosure relates to a polymerization process wherein the emulsifier is introduced in an initial batch as well as during a continuous feed to provide improved mechanical stability of the generated latex. Improved soap coverage can also be achieved during the polymerization process.

13 Claims, 3 Drawing Sheets

PROCESS TO PRODUCE FLUOROPOLYMER-BASED LATEX WITH MECHANICAL STABILITY

CROSS REFERENCE TO RELATED APPLICATIONS

This application is a 371 of International Application No. PCT/EP2016/057299, filed Apr. 4, 2016, which claims priority to U.S. Application No. 62/144,091 filed Apr. 7, 2015, both of which are incorporated herein by reference in their entirety.

TECHNICAL FIELD

The present disclosure concerns methods, processes, and techniques for preparing creaming-free styrene-acrylonitrile copolymer (SAN) encapsulated polytetrafluoroethylene (PTFE) latex (TSAN latex) that has improved latex mechanical stability. Additionally, the present disclosure relates to compositions and articles comprising the compositions made by the methods described herein.

BACKGROUND

PTFE-containing polymers are used as anti-dripping additives in the manufacture of flame retardant thermoplastics. To improve the handling and the compatibility of PTFE with other polymeric matrixes, the anti-dripping additives are created by an aqueous emulsion polymerization processing which unsaturated SAN monomers are added to a fluoropolymer (e.g., PTFE) dispersion to produce a partially SAN-encapsulated PTFE (TSAN) polymer. The encapsulation of PTFE as a core particle with SAN as a shell to form the resulting TSAN composite polymer has at least two benefits: it minimizes the premature fibrillation of the PTFE particles during the coagulation process used to recover TSAN latex and the resulting powdery TSAN latex has improved flowability.

SUMMARY

Under existing PTFE encapsulation processes, it can prove difficult to produce stable TSAN latex. The formation of excess free SAN particles instead of TSAN particles with core/shell TSAN composite structure can result in unstable TSAN latex. Furthermore, if the latex dispersion rests for a long period of time without stirring or agitation prior to coagulation, the dispersion can separate because PTFE has a density higher than water (for example, 2.4 grams per cubic centimeter (2.4 g/cc) as compared to 1 g/cc). Such unstable latex can be susceptible to premature coagulation, or creaming, by shearing force. To help obtain a homogenous composition of TSAN powder after the coagulation process, an additional amount of emulsifying surfactant, or soap, is added to the dispersion in order to stabilize the TSAN latex after the polymerization of the dispersion. The additional soap can help prevent the dispersion from experiencing phase separation (creaming) and enhance the mechanical stability of TSAN latex after polymerization.

Thus, unstable TSAN latex production can result in problems such as latex separation (creaming) or TSAN powder with inconsistent PTFE content, and ultimately material loss or off-grade products.

There is a need in the market for a new SAN-encapsulation process that can produce cream-free TSAN latex without having to add a significant amount of soap. There is also a need in the market for a new process that allows for the production of TSAN latex over a longer period of time while maintaining stable and uniform TSAN latex. These and other shortcomings of the prior art are addressed by the present disclosure.

BRIEF DESCRIPTION OF THE DRAWINGS

The accompanying figures, which are incorporated in and constitute a part of this specification, illustrate several aspects and together with the description serve to explain the principles of the disclosure.

Figure 1:
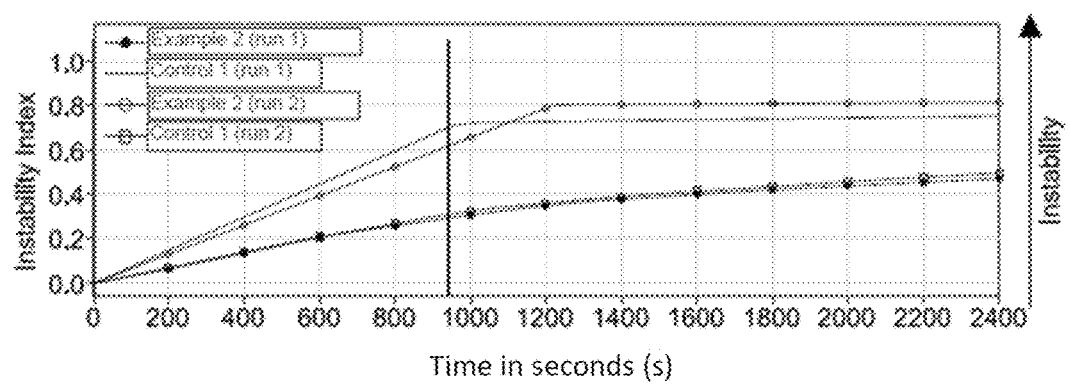
FIG. 1 is a graph of LUMiSizer™ data showing phase separation rate in percent transmission per second for various undiluted TSAN latex dispersions.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure.

DETAILED DESCRIPTION OF ILLUSTRATIVE EMBODIMENTS

The present disclosure can be understood more readily by reference to the following detailed description of the disclosure and the Examples included therein.

In various aspects, the present disclosure provides an aqueous emulsion polymerization process configured to provide stable TSAN latex without the introduction of additional surfactant after the polymerization is complete. The polymerization process can comprise a process sequence designed to graft one or more polymers onto the fluoropolymer-based seeds, thereby encapsulating the PTFE.

The processes disclosed herein can provide stable, homogenous TSAN powder with a consistent PTFE composition. In further aspects of the present disclosure, the charge sequence and the amount of soap and/or initiator can be modified to provide stable TSAN latex. More specifically, stable TSAN latex as disclosed herein can have an improved mechanical stability characterized by a slower rate of separation phases.

In one aspect, the process can comprise a polymerization process to provide stable TSAN latex succeeded by a coagulation process to isolate TSAN resin. The polymerization process can comprise an initial charge of reagents to a reaction vessel coupled with a subsequent feed of reagents to the reaction vessel. In one example, an initial charge of reagents can comprise PTFE dispersion, water, monomers, and tallow fatty acid (TFA) soap heated to an appropriate temperature and allowed to pre-condition for a duration of time prior. As a further example, a continuous feed of reagents can comprise remaining monomers and initiator as the temperature is increased to provide the TSAN latex. Coagulation can comprise the addition of an acid and water to the latex resulting from the polymerization reaction. The resulting wet resin can then be isolated and dried.

In one aspect, the process can consist essentially of a polymerization process to provide stable TSAN latex succeeded by a coagulation process to isolate TSAN resin. The polymerization process can comprise an initial charge of reagents to a reaction vessel coupled with a subsequent feed of reagents to the reaction vessel. In one example, an initial charge of reagents can comprise PTFE dispersion, water, monomers, and tallow fatty acid (TFA) soap heated to an appropriate temperature and allowed to pre-condition for a duration of time prior. As a further example, a continuous feed of reagents can comprise remaining monomers and initiator as the temperature is increased to provide the TSAN latex. Coagulation can comprise the addition of an acid and water to the latex resulting from the polymerization reaction. The resulting wet resin can then be isolated and dried.

In various aspects, the present disclosure relates to a latex polymerization system for the preparation of a latex exhibiting mechanical stability. The latex polymerization system may comprise a reaction vessel receiving an initial charge comprising an aqueous dispersion of polytetrafluoroethylene, a portion of a predetermined amount of unsaturated monomers, a portion of a predetermined amount of a soap. The contents of the vessel may be heated to between 54.4° C. (130° F.) to 60° C. (140° F.) and allowing a resultant dispersion to precondition in the vessel for 15 minutes. A continuous feed may then be introduced to the reaction vessel, the continuous feed comprising a remaining portion of unsaturated monomers, a remaining portion of soap, and a redox initiator system. During the continuous feed, the contents of the vessel may be heated to between 54.4° C. (150° F.) to 60° C. (140° F.) when about fifty percent by weight of the unsaturated monomers have been introduced into the reaction vessel. The contents of the vessel may be cooled to provide a copolymer encapsulated polytetrafluoroethylene latex dispersion, wherein the latex exhibits a mechanical stability such that the latex does not experience phase separation after at least 100 hours of agitation at 200 revolutions per minute (rpm). The resulting latex dispersion may be coagulated to provide a copolymer resin.

Polymerization Process

In an aspect, the polymerization process can involve combining PTFE, more specifically, a PTFE dispersion (e.g., aqueous dispersion), with SAN copolymer. The combination of PTFE with the SAN can facilitate or effectuate the formation or preparation of an intermediate latex product, for example, SAN-encapsulated PTFE latex. The charge sequence and the amount of soap and/or initiator can determine the stability of the generated TSAN latex as well as the homogeneity of the TSAN powder final product with consistent PTFE.

The polymerization process can include charging a reaction vessel, hereinafter vessel, with an aqueous dispersion of PTFE, water, selected monomers, and a surfactant, i.e., soap. The contents of the vessel can be allowed to pre-condition for at least 15 minutes prior to the introduction of a continuous feed of reagents. The continuous feed of reagents can comprise remaining monomers and an initiator system during which the temperature of the contents of the vessel can be raised. In one example, a copolymer of acrylonitrile and styrene (i.e., SAN copolymer) and a redox initiator system (i.e., a combination of oxidant and reductant) including an initiator and activator can be introduced in a continuous feed to the vessel.

In various aspects, the polymerization process can be performed in a vessel, for example, a closed reactor. The vessel can vary in size from, for example, 1 liter to as large as 4,921 liters (1,300 gallons). It will be understood that other vessels and/or reactors of different volumes can also be used for the polymerization process and can be easily and/or conveniently scaled up for industrial manufacture or production of SAN-encapsulated PTFE-based latex (TSAN latex).

A number of monomers and reagents can be used in the polymerization process to produce a TSAN polymer, including ethylenically unsaturated monomers, preferably styrene and acrylonitrile; surfactants such as fatty acid salt; and redox or non-redox initiators. The relative quantities and/or concentrations of one or more monomers or reagents for the polymerization process can be selected and varied, for instance depending on a target speed of reaction and/or a target or intended relative component composition of the intermediate product formed via the polymerization process.

In certain aspects, an aqueous dispersion can be introduced into the vessel as an initial charge. The aqueous dispersion comprising 200 parts by weight (pbw), or about 200 pbw, can include water, preferably demineralized water, in an amount of 150 pbw, or about 150 pbw; from about 45 pbw to about 55 pbw of PTFE, or from about 45 pbw to about 55 pbw of PTFE per 100 pbw of the dispersion; and from about 1 pbw to 5 pbw, or from about 1 pbw to about 5 pbw of fatty acid soap per 100 pbw of the dispersion. In one example, the aqueous dispersion can comprise 50 pbw, or about 50 pbw of demineralized water per 100 pbw of the dispersion, and 4 pbw, or about 4 pbw, of tallow fatty acid (TFA) soap salt per 100 pbw of the dispersion.

In various aspects of the present disclosure, the contents of the vessel can be combined in order to form a homogenous PTFE dispersion. The contents of the vessel can be stirred using a stirrer. In other examples, the contents can be combined using an agitator. A gentle agitation speed can be 120 rpm, or about 120 rpm, depending on the size of the reactor vessel used.

In an aspect, the temperature of the contents of the vessel can be adjusted to a target temperature to facilitate the polymerization reaction. In one example, after the PTFE dispersion, water, and soap of the initial charge of reagents are introduced to the vessel, the temperature of the vessel can be raised to about 57.8° C. (136° F.). In some examples, the temperature can be raised to this desired temperature prior to the addition of monomers or an optional activator.

In some aspects, the temperature of the vessel contents can be determined depending upon the type of initiator system selected for use in the polymerization process. For further example, the target temperature can be between about 54.4° C. (130° F.) to about 71.1° C. (160° F.) for a redox initiator system. In another example, the target temperature can be between 54.4° C. (130° F.) to 71.1° C. (160° F.) for a redox initiator system. In another example, the target temperature can be 57.7° C., or about 57.7° C. (136° F.).

In one aspect, the target temperature can be adjusted by using a heating system, for example, a hot steam jacket system. Other heating systems, for instance heating systems or heaters known in the related art, can also be used for changing, and/or maintaining, the temperature of the vessel. Because the polymerization process can produce appreciable amounts of heat, a cooling system can also be used. The cooling system can also comprise a jacket system. A device can be used to control the heating and cooling of the vessel and its contents. An exemplary device can be a thermocouple. The thermocouple can control the heating and cooling through a software system, or an integrated distributed control system. The thermocouple can be configured to measure the temperature of the jacket system water inlet and outlet.

In various aspects, the polymers or copolymers used for encapsulating the PTFE particles can be any polymer or copolymer obtained by the emulsion polymerization of monomers or mixtures of monomers through the radical initiation. As an example, the copolymer of acrylonitrile and styrene (SAN copolymer) and a redox initiator system can be used as the encapsulating polymer.

In an aspect, the reagents and activators can be introduced into the vessel immediately or substantially immediately upon reaching the intended or target temperature. During addition into the vessel, the temperature of the vessel can be maintained at between 54.4° C. to 71.1° C., or between about 54.4° C. (130° F.) to about 71.1° C. (160° F.), for example at 60° C. (140° F.) or about (60° C.) 140° F. In several embodiments, each of the styrene monomer and the acrylonitrile monomer is added into the vessel immediately, or substantially immediately, upon reaching the intended or target vessel temperature (e.g., 60° C. (140° F.) or about 60° C. (140° F.)). More specifically, a predetermined quantity of the styrene monomer and acrylonitrile monomer (or a specific percentage of total or final amounts of styrene monomer and acrylonitrile monomer) can be first added into the vessel upon reaching the intended or target vessel temperature. For instance, between 5% to 20%, or about 5% to about 20%, (e.g., 10% or about 10%) of total or final amount of styrene monomer and acrylonitrile monomer can be immediately or substantially immediately added into the reactor upon reaching the intended or target vessel temperature (e.g., 60° C., or about 60° C. (140° F.)) to initiate the reaction in the initial stage.

When the temperature has been increased, and is maintained at the target temperature (e.g., between 54.4° C. (130° F.) to 71.1° C. (160° F.), or between about 54.4° C. (130° F.) to about 71.1° C. (160° F.)), each of the styrene monomer and the acrylonitrile monomer can then be added into the vessel in solution form. In addition, a catalyst can be added as an aqueous solution into the vessel subsequent to the increase in reactor temperature. Optionally, the catalyst can be a redox initiator system such as a combination of ferrous-ion/cumene hydroperoxide (CHP), cumene hydroperoxide, ferrous sulfate ($FeSO_4$), tetrasodium pyrophosphate (TSPP), and a reducing sugar such as cerelose or fructose can be added into the vessel just before starting a continuous feed of the monoethylenically unsaturated monomers. Preferably, the catalyst for the polymerization process can be a $FeSO_4$/CHP redox initiator system.

In some aspects, the catalyst may include a catalyst system comprising an activator, a reductant, and an oxidant. The activator may include a ferrous compound, such as ferrous sulfate, and tetrasodium pyrophosphate. The reductant may include a reducing sugar such as cerelose or fructose. The oxidant may include cumene hydroperoxide.

The reagents of the present disclosure may include a tallow fatty acid soap, or a soap emulsifier. A fatty acid soap may be used as an emulsifier for the latex polymerization process. The fatty acid soap may be water soluble. An exemplary tallow fatty acid soap may include a mixture of fatty acids. Exemplary fatty acid soaps may include sodium palmitate, potassium laurate, sodium oleate, ammonium oleate, sodium myristate. In certain examples, the fatty acid soap may include a mixture of fatty acids sourced from porcine derived oil.

In multiple embodiments of the present disclosure, the monomer solutions of styrene and acrylonitrile can be added into the vessel during each of the introduction of catalyst into the vessel and the introduction of the emulsifier into the vessel. More specifically, between 5% to 20%, or between about 5% to about 20%, for example 10% or about 10%, of the monomer solution of styrene and the monomer solution of acrylonitrile can be simultaneously added into the vessel with the catalyst; and between 80% to 95%, or between about 80% to about 95%, for example 90% or about 90%, (i.e., the remainder) of the said two monomer solutions can be subsequently simultaneously added into the reactor.

In some aspects, an appropriate molecular weight regulator (or chain transfer agent/activator) can be added to improve the properties of the final resin product. In one instance, for example, the molecular weight regulator can be added at the initial batch charge of the reaction. Suitable activators include ($C_9$-$C_{13}$) alkyl mercaptan compounds such as tertiary-dodecyl mercaptan (TDDM) or nonyl mercaptan. The amount of molecular weight regulator can vary according to the particular molecular weight regulator, the monomer or mixture of monomers employed, the initiator employed, the polymerization reaction conditions, and so forth. Optionally, chain-transfer activators may be introduced to the reactor to reduce the molecular weight of the second polymer (e.g., SAN) formed during the polymerization process. In an example, the molecular weight regulator can be added in the range of from 0.1 to 3 weight parts of molecular weight regulator, or from about 0.1 to about 3 weight parts of molecular weight regulator per 100 weight parts of the monomer. In a preferred embodiment, no activator is used.

Subsequent to the addition of the initiator, the temperature of the vessel can be increased, for example increased to 65.5° C. (150° F.), or about 65.5° C., after 30 minutes or after about 30 minutes, of initiation and maintained at that temperature until the completion of the addition of the styrene and acrylonitrile monomers. In an example, 31 pbw to 34 pbw, or from about 31 pbw to about 34 pbw of an unsaturated styrene monomer and from 11 pbw to 14 pbw, or about 11 pbw to about 14 pbw, of an unsaturated acrylonitrile monomer per the total weight of polymers can be continuously fed into the reactor. The monomers can be added into the reactor over a time period of between 1.0 hour to 2.5 hours, or between about 1.0 hour to about 2.5 hours, for example 1.5 hours, or about 1.5 hours.

Once the feeds are completed, the reactor is continuously stirred to mix using a stirrer or agitator, stirring at 120 rpm, or about 120 rpm, for 30 minutes, or about 30 minutes, and at a temperature of 65.5° C. (150° F.), or about 65.5° C. to obtain a high conversion rate, e.g., to greater than 97%, or greater than about 97%.

Once the feeds are completed, the contents of the vessel are stirred and/or agitated to mix the contents using a stirrer or agitator. Stirring can be done continuously or periodically so that the contents of the vessel do not separate. In an aspect, the contents of the vessel can be stirred or agitated for 30 minutes, or for about 30 minutes, and at a temperature of 65.5° C. to 71.1° C., or of about 65.5° C. (150° F.) to about 71.1° C. (160° F.) to complete the conversion of monomers to at least about greater than about 97%. The polymerization process can result in an output of at least TSAN latex.

Another predetermined quantity of the styrene monomer and acrylonitrile monomer, or the remainder of the total or final amount of styrene monomer and acrylonitrile monomer, can then be added into the vessel over a time period of between 1.0 hour to 2.5 hours, or between about 1.0 hour to about 2.5, for example approximately 1.5 hours.

In several aspects, surfactants and catalysts can be initially or continuously introduced into the vessel during the monomer charge over a time period of between 1.0 hour to 2.5 hours, or between about 1 hour to about 2.5 hours, for example 1.5 hours, or about 1.5 hours. An example of possible surfactants include a fatty acid salt made from a fatty acid and a caustic solution (e.g., KOH).

The reaction mixture can, optionally, include a minor amount, e.g., up to 5 percent by weight (wt %), or up to about 5 wt %, of a polyethylenically unsaturated "crosslinking" monomer, e.g., butylene diacrylate, divinyl benzene, butene diol dimethacrylate, trimethylolpropane tri(meth) acrylate. As used herein, the term "polyethylenically unsaturated" means having two or more sites of ethylenic unsaturation per molecule.

In addition, a color stabilizer can be added. In several embodiments, the color stabilizer includes tetrasodium pyrophosphate (TSPP), sodium formaldehyde sulfoxylate (SFS), and/or potassium hydroxide (KOH).

The contents of the vessel can then be cooled. In many aspects of the present disclosure, the polymerization process produces an intermediate product, more specifically TSAN latex. TSAN latex includes both SAN copolymer particles and TSAN particles with PTFE-based cores and SAN-based shells that surround, or at least substantially surround, the PTFE-based cores.

The resulting TSAN polymer composition can include 45% to 55%, or about 45% to about 55% by weight of PTFE and 45% to 55%, or about 45% to about 55% by weight of SAN, with a weight ratio of acrylonitrile monomer to styrene monomer ranging from 20/80 to 30/70, for from about 20/80 to about 30/70.

After polymerization, the coagulation and drying process can follow to provide free-flowing TSAN powder. The coagulation of TSAN latex can be accomplished by introducing a heated acid or salt solution to the latex. The solution can be heated to a temperature of 95° C. (35° F.), or about 95° C. The resulting mixture can be a gently agitated and filtered, centrifuged, and dried to yield final dry TSAN powder.

Coagulation Process

The present disclosure further includes the use or performance of a coagulation process subsequent the polymerization process for manufacturing or producing TSAN powders (i.e., the final or resultant product). TSAN powder can exist in a solid, or at least substantially solid, state. In several embodiments, TSAN powders have an increase compatibility with other plastic powders, thereby enhancing or increasing the ease and/or efficiency associated with the mixing of TSAN powders with other plastic powders, for instance during a compounding process for manufacture of plastic or plastic-based products.

TSAN latex produced from a polymerization, for example, as described herein, can then undergo a coagulation process wherein the TSAN latex is exposed to a mixture of water and a coagulant. During the coagulation process, fine particulates agglomerate or clump together and accumulate at the top or settle at the bottom of the dispersion, and can be separated or harvested via a filtration process.

A coagulant can include an acid, for example, but not limited to, acetic acid, sulfuric acid, and phosphoric acid, or a salt, e.g., calcium chloride, magnesium sulfate, and aluminum sulfate. SAN and TSAN particles are co-coagulated and precipitated to form large polymeric coagulum in the acid or salt solution and further hardened at a high temperature.

In addition, a reagent such as sulfuric acid ($H_2SO_4$) can be added as the coagulant. Optionally, a salt such as sodium chloride, sodium sulfate, ammonium acetate, or other salt comprising a monovalent cation and a monovalent anion, followed by the addition of a dilute acid such as sulfuric acid can be added to the reaction mixture.

TSAN latex can be introduced in the vessel containing an acid solution (approximately one to two parts of sulfuric acid in water) and the vessel contents can be heated to 93.3° C. (200° F.) or to about 93.3° C. (200° F.) with vigorous stirring. The solids content of the mixture is no more than 20% by weight, or no more than about 20% by weight. Complete introduction of TSAN latex takes 10 minutes, or about 10 minutes. The contents of the vessel form a slurry, and the slurry can be continuously stirred at 93.3° C. (200° F.) or at about 93.3° C. for 20 minutes or about 20 minutes before centrifuging, forming a wet powder. The wet powder can then be re-dispersed throughout water at a temperature of 54.4° C. (130° F.), or about 54.4° C. (130° F.) for 10 minutes or about 10 minutes to remove residual acid or salt. After centrifugation, the powder can be dried in a fluidized-bed dryer at a temperature of 60° C. (140° F.), or about 60° C. (140° F.), for 2 hours or about 2 hours. A free-flowing powder having a final moisture content of less than 0.5%, or less than about 0.5%, can be obtained.

The coagulation process produces a resultant product, which is TSAN powder. The powder is produced as a suspended substance, product, or powder in water. More specifically, TSAN powder can include solid particles having SAN particles and PTFE-based cores with SAN-based shells surrounding, or at least substantially surrounding, the PTFE-based cores.

In many embodiments, the coagulation process occurs or is can be performed in a vessel, for example a 15-liter vessel. The volume or capacity of the vessel for the coagulation process can be increased, for example for preparing or manufacturing TSAN latex on an industrial scale.

The coagulation process produces a TSAN latex powder. The powder is produced as a suspended substance, product, or powder in water. More specifically, the TSAN latex powder includes solid particles with PTFE-based cores and SAN-based shells surrounding, or at least substantially surrounding, the PTFE-based cores.

Latex Stability

In addition, the present disclosure details novel configurations of temperatures, reagent combinations, relative reagent concentrations and/or quantities, and/or durations during portion(s) of the polymerization process for manufacturing or producing TSAN latex (or the intermediate product). The use of such novel configuration of temperatures, reagent combinations, relative reagent concentrations and/or quantities, and/or durations during portion(s) of the polymerization process can facilitate or enable production of TSAN latex powders (or the final product) that have significantly, surprisingly, and/or unexpectedly enhanced properties or characteristics.

In various aspects, the addition of soap in the initial charge and the feed charge to the polymerization reaction vessel can improve mechanical stability (MMS) of the generated TSAN latex. Mechanical stability can refer to the resistance of the latex to creaming, or the phase separation of the latex. The MMS can be represented according to time, that is, how long the latex can remain stable and resist creaming. This creaming can occur as the latex rests or is allowed to stand for a duration of time without agitation. The creaming effect can be attributed to the density differential of the particles of rubber present in the rubbery latex and the solution throughout which the particles are dispersed. In one example, a TSAN latex polymerization process where the soap is included in the initial charge and is introduced in a continuous feed can resist separation, or creaming, after are more than 100 hours, or more than about 100 hours, of agitation at 200 rpm, or at about 200 rpm. A comparable TSAN latex where the soap is introduced solely in the initial batch can begin to cream within 10 hours, or about 10 hours. As an example, a TSAN latex polymerization process where the initial soap charge is 1.25 pbw, or about 1.25 pbw, and the soap feed is 2.75 pbw, or about 2.75 pbw, can resist creaming after more than 100 hours, or more than about 100 hours, of agitation while a polymerization where the soap addition comprises only an initial batch charge of 4 pbw, or about 4 pbw, can begin to cream within 10 hours or within about 10 hours.

In another aspect, TSAN prepared according to the methods disclosed herein where soap is introduced in the initial charge and during a continuous feed into the vessel, the shelf life of the TSAN latex can be extended. The enhanced shelf-life can be exemplified in an improvement in the stability of the TSAN latex. Stability of the latex can refer to its ability to remain stable or its ability to resist droplet aggregation. Stability may thus be observed by measuring phase separation rates of the dispersion. For example, phase separation rates can be observed through the change in particle size of an emulsion (such as latex) after storage for a specified length of time under controlled conditions or after exposure to specific environmental stresses.

The dimensionless instability index can be used as a measure of the stability of a latex. As an example, the instability index can be determined using a dispersion analyzer, such as a LUMisizer™, which combines a near infra-red (NIR) probe with an analytical centrifuge to determine separation and sedimentation phenomena in the latex. The instability index indicates the degree of instability for the latex emulsion and can be measured by calculating the difference in percent transmittance of light through a sample over a given period of time. These results may then be normalized to the theoretical maximum percent transmittance. The set of transmission curves observed at different positions along the cuvette may be reduced to a single curve by a suitable integration of each of the percent transmission profiles. As such, The instability index may be calculated from the slopes of the transmission curves according to the formula:

$$\Delta \text{Transmission \% (or back scattering)} = f(\text{Time})$$

Accordingly, the lower the instability index, the more stable the dispersion, and the longer the shelf-life may be. Values for the instability index may range from 0-1.0 with a value of zero indicating no instability. A horizontal segment of the curves can indicate the latex sample under consideration does not change with respect to its transmission profile along the testing vessel in the time interval considered. An upturn of the curves is traced to sedimentation/creaming, i.e. instability of the latex.

The instability index may thus reflect the change in viscosity of the TSAN latex over a prolonged period of agitation. Where a given latex can maintain its viscosity for a prolonged period of agitation, little or no creaming has occurred and the latex is more stable. A TSAN latex prepared according to the methods disclosed herein can have an instability index of 0.0003, or about 0.0003, while a TSAN latex obtained from a process where the soap is added in only the initial charge can have an instability index of 0.0007, or about 0.0007.

In further aspects of the present disclosure, introduction of the activator solution during continuous feed of the vessel can improve mechanical stability compared to the introduction during continuous feed. For example, the addition of an activator solution via continuous feed can provide a MMS of 75 minutes, or about 75 minutes compared to 7 minutes, or about 7 minutes, when the activator solution is introduced only in the initial batch feed.

Soap coverage of the polymerization process can also be improved by the use of a split feed of soap and the addition of a activator solution via a continuous feed. Soap coverage can relate to the amount of emulsifier (soap) sufficient to prevent the coalescence of polymer particles in the polymerization process. In one example, with a split addition of soap (1.25 pbw in the initial charge and 2.75 pbw in the continuous feed), soap coverage can be 69%, or about 69%, compared to 55%, or about 55%, where soap added only in the initial batch at 4 parts by weight. As a further example, where the soap feed is split between an initial (1.25 pbw) and continuous feed (2.75 pbw), a continuous feed activator addition can improve soap coverage to 69.3% or about 69.3%; whereas, a polymerization process where the activator is introduced only in the initial batch can have a soap coverage of 60.3%, or about 60.3%.

Accordingly, a split initial and feed charge of soap coupled with an introduction of activator solution via continuous feed can improve stability of the TSAN latex. More specifically, an initial soap charge of 1.25 pbw and continuous feed of 2.75 pbw coupled with the introduction of an activator solution in the continuous feed can provide an MMS of greater than 30 minutes, or greater than about 30 minutes. Indeed, an initial soap charge of 1.25 pbw and continuous feed of 2.75 pbw can provide an MMS of greater than 30 minutes, or greater than about 30 minutes even where the activator solution is introduced in the initial batch charge.

TSAN powder provided by various embodiments of the present disclosure can be used to manufacture plastics or plastic products, including those products that have a smooth or substantially smooth surface. When used as additives, TSAN powder of particular embodiments of the present disclosure provides improved or enhances processability and/or improves mechanical properties (e.g., increased wear resistance or lower surface roughness), are easy to handle and work with (i.e., has an enhanced workability and/or handling ease), and can display enhanced flowability characteristics and reduced agglomeration as compared to existing PTFE powders. Additionally, TSAN powder can be used or combined with other plastic-based resins to produce flame retardant compositions with flame retardant properties.

Definitions

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

It is to be understood that the present compounds, compositions, articles, systems, devices, and/or methods disclosed and described are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Aspects

In various aspects, the present disclosure pertains to and includes at least the following aspects.

Aspect 1. A process comprising: an initial charge comprising: introducing an aqueous dispersion of polytetrafluoroethylene into a vessel; introducing a styrene or acrylonitrile monomer into the vessel; introducing a soap into the vessel; heating the contents of the vessel to between about 54.4° C. (130° F.) to about 60° C. (140° F.); and allowing the dispersion to precondition in the vessel for about 15 minutes; wherein the initial charge comprises introducing about 45 parts by weight about 55 parts by weight of polytetrafluoroethylene, about 5 parts by weight to about 20 parts by weight of the styrene or acrylonitrile monomer, and about 1 part by weight to about 5 parts by weight of the soap into the vessel, and wherein the combined parts by weight value of all components does not exceed 100 parts by weight; a continuous feed comprising: introducing styrene and acrylonitrile monomers; introducing a redox initiator system; introducing a soap; and heating the contents of the vessel to between about 65.6° C. (150° F.) to about 71.1° C. (160° F.) when approximately fifty percent by weight of the styrene monomer, the acrylonitrile monomer, and the copolymer of styrene and acrylonitrile are introduced into the vessel, wherein the continuous feed comprises about 31 parts by weight to about 34 parts by weight of styrene monomer, about 11 parts by weight to about 14 parts by weight of acrylonitrile monomer introduced over a period of time from about 1 hour to about 2.5 hours, about 0.1 to about 2 parts by weight redox initiator system, and from about 1 part by weight to about 5 parts by weight of soap; wherein the polymerization process produces a styrene-acrylonitrile copolymer-encapsulated polytetrafluoroethylene latex dispersion; and coagulating the styrene-acrylonitrile copolymer encapsulated polytetrafluoroethylene latex dispersion, wherein the latex is exposed to a heated mixture of water and a coagulant to produce an output slurry.

Aspect 2. A process consisting essentially of: an initial charge comprising: introducing an aqueous dispersion of polytetrafluoroethylene into a vessel; introducing a styrene or acrylonitrile monomer into the vessel; introducing a soap into the vessel; heating the contents of the vessel to between about 54.4° C. (130° F.) to about 60° C. (140° F.); and allowing the dispersion to precondition in the vessel for about 15 minutes; wherein the initial charge comprises introducing about 45 parts by weight about 55 parts by weight of polytetrafluoroethylene, about 5 parts by weight to about 20 parts by weight of the styrene or acrylonitrile monomer, and about 1 part by weight to about 5 parts by weight of the soap into the vessel, and wherein the combined parts by weight value of all components does not exceed 100 parts by weight; a continuous feed comprising: introducing styrene and acrylonitrile monomers; introducing a redox initiator system; introducing a soap; and heating the contents of the vessel to between about 65.6° C. (150° F.) to about 71.1° C. (160° F.) when approximately fifty percent by weight of the styrene monomer, the acrylonitrile monomer, and the copolymer of styrene and acrylonitrile are introduced into the vessel, wherein the continuous feed comprises about 31 parts by weight to about 34 parts by weight of styrene monomer, about 11 parts by weight to about 14 parts by weight of acrylonitrile monomer introduced over a period of time from about 1 hour to about 2.5 hours, about 0.1 to about 2 parts by weight redox initiator system, and from about 1 part by weight to about 5 parts by weight of soap; wherein the polymerization process produces a styrene-acrylonitrile copolymer-encapsulated polytetrafluoroethylene latex dispersion; and coagulating the styrene-acrylonitrile copolymer encapsulated polytetrafluoroethylene latex dispersion, wherein the latex is exposed to a heated mixture of water and a coagulant to produce an output slurry.

Aspect 3. The process of any of aspects 1-2, wherein the styrene or acrylonitrile monomer added in the initial charge is a portion of a predetermined total quantity of styrene or acrylonitrile monomer.

Aspect 4. The process of aspect 3, wherein the introducing styrene and acrylonitrile monomers of the continuous feed comprise introducing a remaining portion of styrene or acrylonitrile monomer.

Aspect 5. The process of any of aspects 1-4, wherein the styrene or acrylonitrile is added in the initial feed after the contents of the vessel have been heated to about 135° F.

Aspect 6. The process of any of aspects 1-5, further comprising combining a chain transfer agent or crosslinking agent with introducing the aqueous dispersion, styrene monomer, and soap.

Aspect 7. The process of any of aspects 1-6, wherein the soap comprises tallow fatty acid soap.

Aspect 8. The process of any of aspects 1-7, wherein the redox initiator system comprises a redox agent and an activator.

Aspect 9. The process of aspect 8, wherein the redox initiator system comprises a mixture of cumene hydroperoxide and a combination of sugar, ferrous sulfate, and tetrasodium pyrophosphate.

Aspect 10. The process of any of aspects 1-9, wherein the initial batch charge or continuous feed comprises a molecular weight regulator.

Aspect 11. The process of any of aspects 1-10, wherein the styrene and acrylonitrile monomers of the continuous feed are introduced in an amount pre-determined according to the amount introduced in the initial charge.

Aspect 12. The process of any of aspects 1-11, wherein the coagulant is sulfuric acid.

Aspect 13. The process of any of aspects 1-12, wherein the output slurry is dried to produce resin powder.

Aspect 14. A process comprising: introducing an initial charge to a reaction vessel comprising an aqueous dispersion of polytetrafluoroethylene, a portion of a predetermined amount of unsaturated monomers, a portion of a predetermined amount of a soap; heating the contents of the vessel to between about 54.4° C. (130° F.) to about 60° C. (140° F.) and allowing the resultant dispersion to precondition in the vessel for about 15 minutes; introducing a continuous feed to the reaction vessel comprising a remaining portion of unsaturated monomers, a remaining portion of soap, and a redox initiator system; heating the contents of the vessel to between about 65.6° C. (150° F.) to about 71.1° C. (160° F.) when about fifty percent by weight of the unsaturated monomers have been introduced into the reaction vessel; cooling the contents of the vessel to provide a copolymer encapsulated polytetrafluoroethylene latex dispersion, wherein the latex exhibits enhanced mechanical stability such that the latex does not experience phase separation after at least about 100 hours of agitation at about 200 rpm; coagulating the latex dispersion to provide a copolymer resin.

Aspect 15. A process consisting essentially of: introducing an initial charge to a reaction vessel comprising an aqueous dispersion of polytetrafluoroethylene, a portion of a predetermined amount of unsaturated monomers, a portion of a predetermined amount of a soap; heating the contents of the vessel to between about 54.4° C. (130° F.) to about 60° C. (140° F.) and allowing the resultant dispersion to precondition in the vessel for about 15 minutes; introducing a continuous feed to the reaction vessel comprising a remaining portion of unsaturated monomers, a remaining portion of soap, and a redox initiator system; heating the contents of the vessel to between about 65.6° C. (150° F.) to about 71.1° C. (160° F.) when about fifty percent by weight of the unsaturated monomers have been introduced into the reaction vessel; cooling the contents of the vessel to provide a copolymer encapsulated polytetrafluoroethylene latex dispersion, wherein the latex exhibits enhanced mechanical stability such that the latex does not experience phase separation after at least about 100 hours of agitation at about 200 rpm; coagulating the latex dispersion to provide a copolymer resin.

Aspect 16. The process of aspect 14, wherein the initial charge comprises from about 45 parts by weight to about 55 parts by weight of polytetrafluoroethylene, about 1 part by weight to about 20 parts by weight of styrene, and from about 1 part by weight to about 5 parts by weight of soap.

Aspect 17. The process of any of aspects 14-16, wherein the initial charge of soap is about 1.25 parts per weight and the continuous charge of soap is about 2.75 parts by weight.

Aspect 18. The process of any of aspects 14-17, wherein the unsaturated monomers are styrene or acrylonitrile.

Aspect 19. The process of any of aspects 14-18, wherein the unsaturated monomers are added in the initial charge after the vessel has been heated to about 135° F.

Aspect 20. The process of any of aspects 14-19, further comprising combining a chain transfer agent or crosslinking agent with introducing the aqueous dispersion, styrene monomer, and soap.

Aspect 21. The process of any of aspects 14-20, wherein the soap comprises tallow fatty acid soap.

Aspect 22. The process of any of aspects 14-21, wherein the redox initiator system comprises a mixture of cumene hydroperoxide and a combination of sugar, ferrous sulfate, and tetrasodium pyrophosphate.

Aspect 23. The process of any of aspects 14-22, wherein the initial charge or continuous feed comprises a molecular weight regulator.

Aspect 24. The process of any of aspects 14-23, wherein the coagulant is sulfuric acid.

Aspect 25. The process of any of aspects 1-24, wherein the latex comprises from about 25 wt. % to about 65 wt. % solids.

Aspect 25. A process comprising: an initial charge comprising: introducing an aqueous dispersion of polytetrafluoroethylene into a vessel; introducing a styrene or acrylonitrile monomer into the vessel; introducing a soap into the vessel; heating the contents of the vessel to between 54.4° C. (130° F.) to 60° C. (140° F.); and allowing the dispersion to precondition in the vessel for about 15 minutes; wherein the initial charge comprises introducing 45 parts by weight 55 parts by weight of polytetrafluoroethylene, 5 parts by weight to 20 parts by weight of the styrene or acrylonitrile monomer, and 1 part by weight to 5 parts by weight of the soap into the vessel, and wherein the combined parts by weight value of all components does not exceed 100 parts by weight; a continuous feed comprising: introducing styrene and acrylonitrile monomers; introducing a redox initiator system; introducing a soap; and heating the contents of the vessel to between 65.6° C. (150° F.) to 71.1° C. (160° F.)

when approximately fifty percent by weight of the styrene monomer, the acrylonitrile monomer, and the copolymer of styrene and acrylonitrile are introduced into the vessel, wherein the continuous feed comprises 31 parts by weight to 34 parts by weight of styrene monomer, 11 parts by weight to 14 parts by weight of acrylonitrile monomer introduced over a period of time from 1 hour to 2.5 hours, 0.1 to 2 parts by weight redox initiator system, and from 1 part by weight to 5 parts by weight of soap; wherein the polymerization process produces a styrene-acrylonitrile copolymer-encapsulated polytetrafluoroethylene latex dispersion; and coagulating the styrene-acrylonitrile copolymer encapsulated polytetrafluoroethylene latex dispersion, wherein the latex is exposed to a heated mixture of water and a coagulant to produce an output slurry.

Aspect 26. The process of aspect 25, wherein the styrene or acrylonitrile monomer added in the initial charge is a portion of a predetermined total quantity of styrene or acrylonitrile monomer.

Aspect 27. The process of aspect 26, wherein the introducing styrene and acrylonitrile monomers of the continuous feed comprise introducing a remaining portion of styrene or acrylonitrile monomer.

Aspect 28. The process of aspect 27 wherein the styrene or acrylonitrile is added in the initial feed after the contents of the vessel have been heated to 57.2° C. (135° F.).

Aspect 29. The process of any of aspects 25-28, further comprising combining a chain transfer agent or crosslinking agent with introducing the aqueous dispersion, styrene monomer, and soap.

Aspect 30. The process of any of aspects 25-29, wherein the soap comprises tallow fatty acid soap.

Aspect 31. The process of any of aspects 25-30, wherein the redox initiator system comprises a redox agent and an activator.

Aspect 32. The process of aspects 25-31, wherein the redox initiator system comprises a mixture of cumene hydroperoxide and a combination of sugar, ferrous sulfate, and tetrasodium pyrophosphate.

Aspect 33. The process of any of aspects 25-32, wherein the initial batch charge or continuous feed comprises a molecular weight regulator.

Aspect 34. The process of any of aspects 25-33, wherein the styrene and acrylonitrile monomers of the continuous feed are introduced in an amount pre-determined according to the amount introduced in the initial charge.

Aspect 35. The process of any of aspects 25-34, wherein the coagulant is sulfuric acid.

Aspect 36. The process of any of aspects 25-35, wherein the output slurry is dried to produce resin powder.

Aspect 37. A process comprising: introducing an initial charge to a reaction vessel comprising an aqueous dispersion of polytetrafluoroethylene, a portion of a predetermined amount of unsaturated monomers, a portion of a predetermined amount of a soap; heating the contents of the vessel to between 54.4° C. (130° F.) to 60° C. (140° F.) and allowing the resultant dispersion to precondition in the vessel for 15 minutes; introducing a continuous feed to the reaction vessel comprising a remaining portion of unsaturated monomers, a remaining portion of soap, and a redox initiator system; heating the contents of the vessel to between 54.4° C. (150° F.) to 60° C. (140° F.) when about fifty percent by weight of the unsaturated monomers have been introduced into the reaction vessel; cooling the contents of the vessel to provide a copolymer encapsulated polytetrafluoroethylene latex dispersion, wherein the latex exhibits enhanced mechanical stability such that the latex does not experience phase separation after at least 100 hours of agitation at 200 rpm; coagulating the latex dispersion to provide a copolymer resin.

Aspect 38. The process of aspect 37, wherein the initial charge comprises from 45 parts by weight to 55 parts by weight of polytetrafluoroethylene, 1 part by weight to 20 parts by weight of styrene, and from 1 part by weight to 5 parts by weight of soap.

Aspect 39. The process of any of aspects 37-38, wherein the initial charge of soap is 1.25 parts per weight and the continuous charge of soap is 2.75 parts by weight.

Aspect 40. The process of any of claims 37-39, wherein the unsaturated monomers are styrene or acrylonitrile.

Aspect 41. The process of any of claims 37-40, wherein the unsaturated monomers are added in the initial charge after the vessel has been heated to 57.2° C. (135° F.).

Aspect 42. The process of any of claims 37-41, further comprising combining a chain transfer agent or crosslinking agent with introducing the aqueous dispersion, styrene monomer, and soap.

Aspect 43. The process of any of claims 37-42, wherein the initial charge or continuous feed comprises a molecular weight regulator.

Aspect 44. The process of any of claims 37-43, wherein the latex comprises from 25 wt. % to 65 wt. % solids.

Aspect 45. A latex polymerization system comprising: a reaction vessel receiving an initial charge comprising an aqueous dispersion of polytetrafluoroethylene, a portion of a predetermined amount of unsaturated monomers, a portion of a predetermined amount of a soap; the contents of the vessel heated to between 54.4° C. (130° F.) to 60° C. (140° F.) and allowing the resultant dispersion to precondition in the vessel for 15 minutes; a continuous feed introduced to the reaction vessel, the continuous feed comprising a remaining portion of unsaturated monomers, a remaining portion of soap, and a redox initiator system; the contents of the vessel heated to between 54.4° C. (150° F.) to 60° C. (140° F.) when about fifty percent by weight of the unsaturated monomers have been introduced into the reaction vessel; the contents of the vessel cooled to provide a copolymer encapsulated polytetrafluoroethylene latex dispersion, wherein the latex exhibits enhanced mechanical stability such that the latex does not experience phase separation after at least 100 hours of agitation at 200 rpm; the latex dispersion coagulated to provide a copolymer resin.

Aspect 46. The system of aspect 45, wherein the initial charge comprises from 45 parts by weight to 55 parts by weight of polytetrafluoroethylene, 1 part by weight to 20 parts by weight of styrene, and from 1 part by weight to 5 parts by weight of soap and wherein the initial charge of soap is 1.25 parts per weight and the continuous charge of soap is 2.75 parts by weight.

Aspect 47. The system of any of aspects 45-46, wherein the unsaturated monomers are styrene or acrylonitrile.

Aspect 48. The system of any of aspects 45-47, wherein the unsaturated monomers are added in the initial charge after the vessel has been heated to 57.2° C. (135° F.).

Aspect 49. The system of any of aspects 45-48, further comprising combining a chain transfer agent or crosslinking agent with introducing the aqueous dispersion, styrene monomer, and soap.

Aspect 50. The system of any of aspects 45-49, wherein the initial charge or continuous feed comprises a molecular weight regulator.

Aspect 51. The system of any of aspects 45-50, wherein the latex comprises from 25 wt. % to 65 wt. % solids.

Aspect 52. The process of any aspects 1-12, wherein the output slurry is dried to produce resin powder.

EXAMPLES

The following examples are provided to illustrate the compositions, processes, and properties of the present disclosure. The examples are merely illustrative and are not intended to limit the disclosure to the materials, conditions, or process parameters set forth therein.

Table 1 shows the typical components for a commercially available TSAN Latex (Control Example 1).

TABLE 1

Components of Commercially Available TSAN Latex
CONTROL EXAMPLE 1

| Step | Description | CAS | Amount |
|---|---|---|---|
| Initial Feed at 54.4° C. (130° F.) for 15 minutes | PTFE (Algoflon D 1610F) | 9002-84-0 | 50 pbw |
| | Water | 7732-18-5 (deionized) | 150 pbw |
| | Styrene | 100-42-5 | 5 pbw |
| | T-DDM | 25103-58-6 | 0.05 pbw |
| | TFA Soap | 67701-06-8 | 4 pbw |
| | Monomers (Acrylonitrile and Styrene) | — | 45 pbw |
| Continuous Feed at 54.4° C. (130° F.) to 65.6° C. (150° F.) for 1.5 hours | Acrylonitrile | 107-13-1 | 12 pbw |
| | Styrene | 100-42-5 | 33 pbw |
| | Redox Initiator System with CHP | — | 0.35 pbw |
| | TFA Soap | Tallow fatty acids: 67701-06-8 | 0 |

Table 2 shows the components for a novel embodiment of TSAN Latex as described in this disclosure (e.g., Example 2).

TABLE 2

Novel TSAN Latex
EXAMPLE 2

| Step | Description | CA | Amount |
|---|---|---|---|
| Initial Feed at 54.4° C. (130° F.) for 15 minutes | PTFE (Algoflon D 1610F) | 9002-84-0 | 50 pbw |
| | Water | 7732-18-5 (deionized) | 150 pbw |
| | Styrene | 100-42-5 | 5 pbw |
| | T-DDM | 25103-58-6 | 0.05 pbw |
| | TEA Soap | 67701-06-8 | 1.25 pbw |
| Continuous Feed at 54.4° C. (130° F.) to 65.6° C. (150° F.) for 1.5 hours | Acrylonitrile/ | 107-13-1 | 12 pbw |
| | Styrene | 100-42-5 | 33 pbw |
| | Redox Initiator System with CHP | NA | 0.35 pbw |
| | TEA Soap | Tallow fatty acids: 67701-06-8 | 2.75 pbw |

Initial charges including a PTFE dispersion, water, tertiary-dodecyl mercaptan (TDDM), and tallow-fatty acid soap were heated to 54.4° C. (136° F.) before the addition of monomer (styrene). The mixture was pre-conditioned for at least 15 minutes before initiating the reaction by continuous feeds. The remaining acrylonitrile and styrene monomers and the redox initiator system [0.3 parts cumene hydroperoxide CHP, 0.003 parts ferrous sulfate, 0.03 parts tetrasodium pyrophosphate TSPP, and 0.375 parts reducing sugar fructose, in parts relevant to 100 parts of total polymers (PTFE+styrene+acrylonitrile)] were added via a continuous feed as the temperature was raised to 65.6° C. (150°) F. at the midpoint, a duration of 1.5 hours. A molecular weight adjustor was also introduced to adjust molecular weight of copolymers. The TSAN resin was obtained by coagulating the latex in hot water and sulfuric acid $H_2SO_4$ as a coagulant at about 93.3° C. (200° F.). The resultant slurry was then centrifuged to separate water and the resulting wet resin was dried to less than 0.5 wt. % moisture content.

Table 3 shows the mechanical stability (MMS) of Control Example 1 and Example 2. As shown in Table 3, by reducing the amount of TFA soap added in the initial charge of the polymerization process and then adding the remaining TFA soap into the continuous feed, the soap coverage increases from approximately 55% to approximately 69%. This modification of how much soap is added and when the soap is added to the emulsion polymerization process results in a more than ten-fold increase of the MMS of the novel TSAN latex, from 7 minutes to 75 minutes.

TABLE 3

Comparison of TSAN Latexes' Mechanical Stability
MECHANICAL STABILITY

| | Control Example 1 | Example 2 |
|---|---|---|
| Latex Solids (%) | 39 | 39 |
| Initial Soap Feed (pbw) | 4 | 1.25 |
| Continuous Soap Feed (pbw) | 0 | 2.75 |
| Soap Coverage (%) | 55 | 69 |
| Instability Index | 0.0007 | 0.0003 |
| MMS (min) | 7 | 75 |

A near infrared centrifugation technique was also used to estimate the long term stability of the latex formulations to particle sedimentation for Control Example 1 and Example 2 all containing 39% latex solids. Control Example 1 and Example 2 were analyzed with a multi-sample analytical centrifuge-LumiSizer™ to simultaneously measure the intensity of transmitted light passed through a sample as a function of time to measure the degree of sedimentation. Each sample was measured twice (designated run 1 and run 2) to provide four transmission spectra as shown in FIG. 1. The analytical centrifuge LUMiSizer™ allows one to speed-up the separation of dispersions by application of a centrifugal force (acceleration in the movement of particles compared to normal gravity) to the sample. The separation behavior of the individual samples can then be compared and analyzed in detail by tracing the variation in near infrared transmission through any part of the sample or by tracing the movement of any phase boundary.

The LUMiSizer™ Analyzer results are shown in FIG. 1. Specifically, as quantified by the LUMiSizer™ Analyzer, Control Example 1 for an instability index of 0.0008 and 0.0007. Yet TSAN Example 2, two trials represented by the two overlapping curves of the four curves shown in FIG. 1 have a much lower instability index of 0.0003. These lower values indicate that the latexes made from the disclosed formula not only have enhanced mechanical stability but also prolonged shelf-life when compared to the commercially available TSAN latexes. Table 4 provides the observed values as well as the averages for the slope observed for trials of Control Example 1 and Example 2. The instability index ranges from 0-1.0 with a value of zero indicating no instability. The lower the instability index, the more stable the dispersion.

TABLE 4

Instability indices for control and inventive samples.

|  | Start in seconds (s) | End in seconds (s) | Instability Index (Slope) |
|---|---|---|---|
| Control Example 1 | 20.47 | 940.57 | 0.0008 |
| Control Example 1 | 20.71 | 940.75 | 0.0007 |
| Average |  |  | 0.00075 |
| Example 2 | 20.37 | 904.45 | 0.0003 |
| Example 2 | 20.58 | 940.66 | 0.0003 |
| Average |  |  | 0.0003 |

Transmission-position spectra for two runs of each of the Control Example 1 and Example 2 were prepared using the LUMiSizer™ Analyzer. The set of transmission curves was observed at different positions along the sampling vessel (a cuvette) and the data obtained for the curves was reduced to a single curve by a suitable integration of each of the percent transmission profiles. The integration of these curves was used to extrapolate the instability index as presented in Table 4. Stability of the latex was also used by examining the transmission spectra. A horizontal segment of the curve indicated the latex sample under consideration did not change with respect to its transmission profile along the cuvette in the time interval considered. An upturn of the curve was traced to sedimentation/creaming, i.e. instability of the latex. A sharp upturn or abrupt change in the curves also indicated sedimentation or creaming. The curves for the two trials of Control Example 1 exhibited abrupt changes in the percent transmission. The curves for the two trials of Example 2 were horizontal and exhibit a gradual change in the percent transmission. As such, when compared to the curves representing Control Example 1, the curves of the transmission spectra for Example 2 correspond to greater stability in Example 2.

Figure 2:
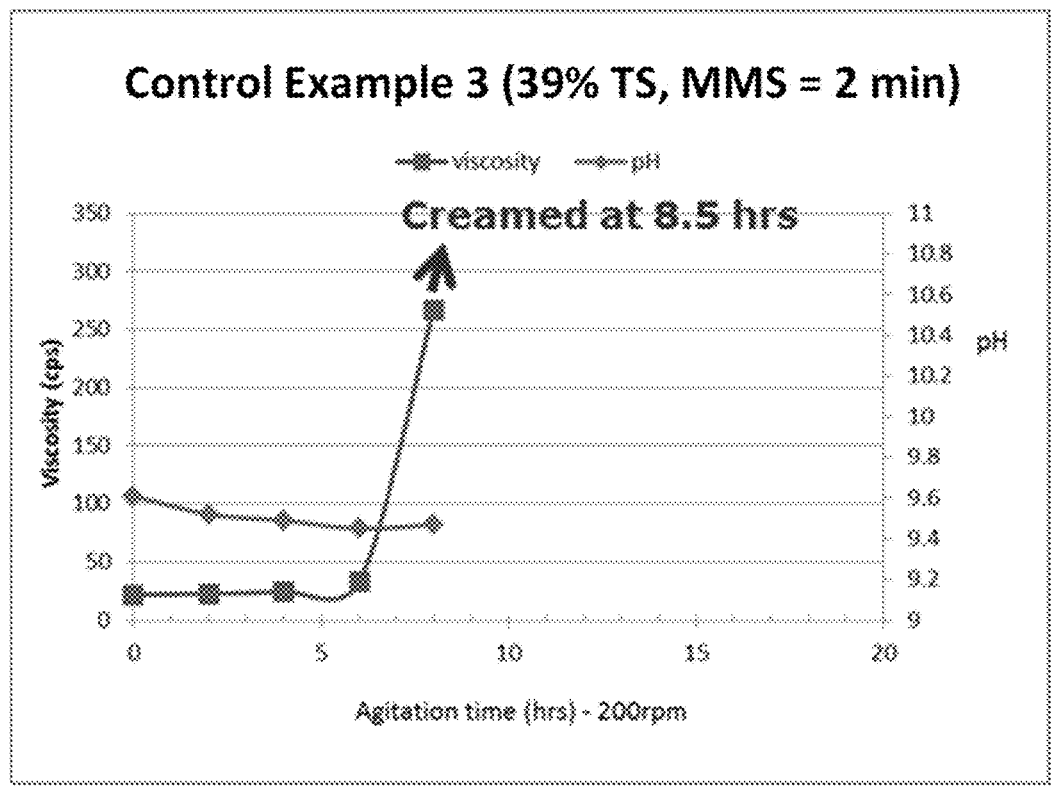
FIG. 2 is a plot of viscosity and pH against agitation time for a sample of commercially available TSAN latex.
Figure 3:
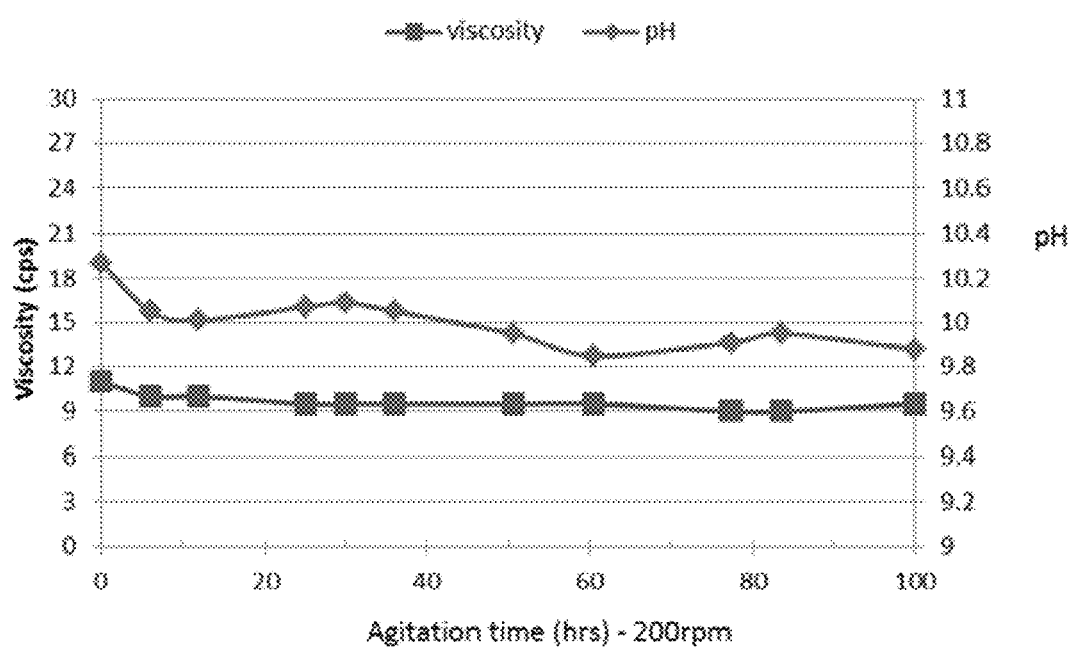
FIG. 3 is a plot of viscosity and pH against agitation time for a sample of TSAN latex according to an aspect of the present disclosure.

One TSAN latex was prepared according to the formula in Table 1 (Control Example 3) and one TSAN latex was prepared according to the formula in Table 2, (Example 4). These latexes are labeled Control Example 3 in FIG. 2 and Example 4 in FIG. 3. Both latexes (39% TSAN) were subjected to a lab-scale coagulation simulation by stirring the dispersion under continuous agitation at 200 rpm for at least 100 hours. The novel, creaming-free nature of TSAN Example 4 is demonstrated in FIG. 3. In particular, 4 shows that the TSAN Example 4 latex was able to maintain its original viscosity throughout the prolonged agitation (i.e., no creaming occurred notwithstanding more than 100 hours of continuous agitation) due to high mechanical stability (MMS) (55 minutes) whereas the Control Example 3 latex was found to cream in 8.5 hours due to low MMS (2 minutes only) as shown in FIG. 2.

Table 5 shows the unexpected effects of activator solution charge sequence on TSAN latex stability. If the activator solution is added via initial batch charge instead of a continuous feed, its mechanical stability is reduced significantly from 75 minutes to 7 minutes while the soap coverage is reduced only from 69% to 60%. The result indicates that a combination of initial/feed soap charge and a continuous activator feed are critical to produce stable TSAN latex free of creaming.

TABLE 5

The Effects of Activator Charge Sequence in Making TSAN Latexes

|  | Example 5 | Example 6 |
|---|---|---|
| Latex Solids (%) | 39 | 39 |
| Initial Soap Feed (pbw) | 1.25 | 1.25 |
| Continuous Soap Feed (pbw) | 2.75 | 2.75 |
| Activator Charge Mode | Feed | Batch Charge |
| Soap Coverage (%) | 69.3 | 60.3 |
| Instability Index | 0.0002 | 0.0005 |
| MMS (min) | 75 | 7 |

Examples 7, 8, 9, and 10 in Table 6 demonstrate that there exists an important level of initial soap charge to achieve a stable TSAN latex. Example 7 and 8 show that MMS was maintained at about 10 minutes when the initial soap level was between about 4 parts to about 1.75 parts. But MMS increased to greater than about 30 minutes when the initial soap feed levels was at about 1.25 parts as demonstrated in Example 9. Examples 9 and 10 show stable latex can be achieved by reducing initial soap from 1 part to 0.5 parts, even when activator is batch charged which tends to reduce MMS as shown in Example 4. The formula and charge sequence used in Example 9 was selected as a candidate for producing stable TSAN latex without the need for additional soap to prevent it from creaming (irreversible premature coagulation due to poor stability) under prolonged agitation.

TABLE 6

The Existing Optimal Initial Soap Level to Achieve Stable TSAN Latex

|  | Example 7 | Example 8 | Example 9 | Example 10 |
|---|---|---|---|---|
| Latex Solids (%) | 39 | 39 | 39 | 40 |
| Initial Soap Feed (pbw) | 4 | 1.75 | 1.25 | 0.5 |
| Continuous Soap Feed (pbw) | 0 | 2.25 | 2.75 | 2.75 |
| Activator Charge Mode | Feed | Feed | Feed | Batch Charge |
| MMS (min) | 11 | 9 | >30 | >30 |

Example 2 (also Example 9) was selected to scale up for production of a creaming-free TSAN latex with superior MMS (MMS greater than about 60 minutes) without post-adding TFA soap as is typically done in the existing latex production process (Control—Example 1) in a processing plant. Table 7 summarizes the plant trial results. The production scale up demonstrates that the novel TSAN process improves soap coverage, latex stability, and shelf-life (lower instability index as observed in the novel TSAN latex without additional TFA soap added after polymerization whereas 3 pbw more of TFA is required in the existing process to prevent it from creaming) while meeting all the resin quality requirements with more consistent flowability. The plant trial data also shows that the new process increases the SAN conversion by about 1% (i.e., lowering emission on acrylonitrile by about 25% and styrene by about 65%).

TABLE 7

The Latex and Resin Properties of Novel TSAN and Control TSAN

| | Control Example 1 | TSAN (Example 9) |
|---|---|---|
| Rx Latex (Reactor) | | |
| pH | 10 | 10 |
| Latex Solids (%) | 38.5 | 38.3 |
| Viscosity (cps) | 15 | 10 |
| Soap Coverage (%) | 53 | 69 |
| MMS (min) | 3.5 | 120+ |
| Residual-Acrylonitrile (ACN) (parts per million, ppm) | 1099 | 842 |
| Residual-Styrene (STY) (ppm) | 2159 | 766 |
| Conversion (%) | 98.4 | 99.2 |
| Instability Index | 0.0008 | 0.0006 |
| RB Latex (Blend Tank) | | |
| Latex Solids (%) | 27-28 | 32 |
| Instability Index | 0.0017 | 0.0007 |
| Dry Resin | | |
| Composition by FTIR (47-53%) | 51.6 | 51.5 |
| Composition by FTIR (8-12%) | 10.6 | 10.6 |
| Composition by FTIR (37.6-42.4%) | 37.9 | 37.8 |
| Funnel Flow (8 min) (grams per second, g/s) | 5-9 | 8.8 ± 0.6 |
| Bulk Density (15.8-28.1 pounds per cubic foot, lbs/ft$^3$) [240.3 kilograms per cubic meter, kg/m$^3$-450.12 kg/m$^3$] | 22.3 ± 0.4 [357.2 ± 6.4] | 24.3 ± 1.2 [389.2 ± 19.2] |
| STY NAV (1000 max) (ppm) | 272 ± 72 | 228 ± 12 |
| ACN NAV (50 max) (ppm) | 0 | 0 |

What is claimed:

1. A polymerisation process comprising:
charging an initial charge of reagents to a reaction vessel and a subsequent feed of reagents to the reaction vessel, wherein the initial charge comprises a polytetrafluoroethylene dispersion, water, a portion of a predetermined amount of monomers and a portion of a predetermined amount of tallow fatty acid soap heated to an appropriate temperature and allowed to pre-condition for a duration of time prior and the subsequent feed comprises an initiator, a remaining portion of the predetermined amount of monomers and a remaining portion of the predetermined amount of tallow fatty acid soap.

2. The process according to claim 1, wherein the monomers are styrene and acrylonitrile.

3. The process according to claim 1, wherein the contents of the reaction vessel are allowed to pre-condition for at least 15 minutes prior to the charging of the subsequent feed of reagents.

4. The process according to claim 1, wherein the temperature of the contents of the vessel is raised during the charging of the subsequent feed of reagents.

5. The process according to claim 1, wherein the temperature of the contents of the vessel is between 54.4° C. (130° F.) and 71.1° C. (160° F.).

6. The process according to claim 1, wherein the initiator is a combination of cumene hydroperoxide, ferrous sulfate, tetrasodium pyrophosphate and a reducing sugar.

7. The process of claim 2 wherein a poly(tetrafluoroethylene)-styrene-acrylonotrile resin is formed further comprising a coagulation process to isolate the poly(tetrafluoropolyethylene-styrene-acrylonitrile) resin.

8. The process of claim 7 wherein the coagulation comprises the addition of an acid and water to the latex resulting from the polymerisation reaction.

9. The process of claim 7 wherein the isolated poly (tetrafluoropolyethylene-styrene-acrylonitrile) resin is dried upon isolation.

10. The process of claim 1 wherein the polytetrafluoroethylene is present in an amount of 45 to 55 parts by weight, the portion of the predetermined amount of monomers in the initial charge is from 1 to 20 parts by weight and the portion of the predetermined amount of tallow fatty acid soap in the initial charge is less than 1.75 parts by weight.

11. The process of claim 1 wherein the initial charge does not include activator and an activator is present in the subsequent feed.

12. The process of claim 1 wherein the portion predetermined amount of monomer is either styrene or acrylonitrile in an amount of 1 to 20 parts by weight.

13. A process, wherein the process comprises:
a. an initial charge comprising:
introducing an aqueous dispersion of polytetrafluoroethylene into a vessel;
introducing a styrene or acrylonitrile monomer into the vessel;
introducing a soap into the vessel;
heating the contents of the vessel to between 54.4° C. (130° F.) to 60° C. (140° F.); and
allowing the dispersion to precondition in the vessel for 15 minutes;
wherein the initial charge comprises introducing 45 parts by weight to 55 parts by weight of polytetrafluoroethylene, 1 to 20 parts by weight of the styrene or acrylonitrile monomer, and 0.5 part by weight to 5 parts by weight of the soap into the vessel;
b. after a., a continuous feed comprising:
introducing styrene and acrylonitrile monomers;
introducing a redox initiator system;
introducing a soap; and
heating the contents of the vessel to between 65.6° C. (150° F.) to 71.1° C. (160° F.) when approximately fifty percent by weight of the styrene monomer, the acrylonitrile monomer, are introduced into the vessel,
wherein the continuous feed comprises 31 parts by weight to 34 parts by weight of styrene monomer, 11 parts by weight to 14 parts by weight of acrylonitrile introduced over a period of time from 1 hour to 2.5 hours, 0.1 to 2 parts by weight redox initiator system, and from 1 part by weight to 5 parts by weight of soap; and
wherein the polymerisation process produces a styrene-acrylonitrile copolymer encapsulated polytetrafluoroethylene latex dispersion;
and
c. coagulating the styrene-acrylonitrile copolymer encapsulated polytetrafluoroethylene latex dispersion, wherein the latex is exposed to a heated mixture of water and a coagulant to produce an output slurry.

* * * * *